(12) United States Patent
Jassby et al.

(10) Patent No.: US 10,654,001 B2
(45) Date of Patent: May 19, 2020

(54) CONDUCTIVE THIN-FILMS FOR DIRECT MEMBRANE SURFACE ELECTROHEATING

(71) Applicant: THE REGENTS OF THE UNIVERSITY OF CALIFORNIA, Oakland, CA (US)

(72) Inventors: David Jassby, Riverside, CA (US); Alexander V. Dudchenko, Riverside, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 16/023,530

(22) Filed: Jun. 29, 2018

(65) Prior Publication Data

US 2019/0009217 A1 Jan. 10, 2019

Related U.S. Application Data

(60) Provisional application No. 62/527,953, filed on Jun. 30, 2017.

(51) Int. Cl.
| | |
|---|---|
| *B01D 61/36* | (2006.01) |
| *B01D 69/14* | (2006.01) |
| *C02F 1/44* | (2006.01) |
| *B01D 71/02* | (2006.01) |
| *B01D 67/00* | (2006.01) |

(Continued)

(52) U.S. Cl.
CPC ......... *B01D 61/368* (2013.01); *B01D 61/364* (2013.01); *B01D 61/366* (2013.01); *B01D 65/08* (2013.01); *B01D 67/0079* (2013.01); *B01D 69/141* (2013.01); *B01D 69/148* (2013.01); *B01D 71/021* (2013.01); *C02F 1/447* (2013.01); *B01D 69/12* (2013.01); *B01D 71/38* (2013.01); *B01D 2313/22* (2013.01); *B01D 2323/26* (2013.01); *B01D 2325/26* (2013.01); *B01D 2325/28* (2013.01); *C02F 2103/08* (2013.01);

(Continued)

(58) Field of Classification Search
None
See application file for complete search history.

(56) References Cited

U.S. PATENT DOCUMENTS

| | | | | |
|---|---|---|---|---|
| 2004/0143063 | A1* | 7/2004 | Chen | C08G 18/0823 525/131 |
| 2010/0323573 | A1* | 12/2010 | Chu | B01D 65/08 442/153 |

(Continued)

OTHER PUBLICATIONS

Shannon et al., "Science and technology for water purification in the coming decades", Nature, Mar. 20, 2008, pp. 301-310, vol. 452, Nature Publishing Group.

(Continued)

*Primary Examiner* — Richard C Gurtowski
(74) *Attorney, Agent, or Firm* — Buchanan Ingersoll & Rooney PC

(57) ABSTRACT

A method is disclosed for preventing carbon nanotube degradation in ionizable environments. The method includes immersing a porous thin-film nanotube (CNT)/polymer composite Joule heating element in an ionizable environment; and applying an alternating current at a frequency of at least 100 Hz to the porous thin-film nanotube (CNT)/polymer composite Joule heating element in the ionizable environment.

20 Claims, 5 Drawing Sheets

(51) Int. Cl.
  *B01D 65/08*   (2006.01)
  *C02F 103/08*   (2006.01)
  *B01D 71/38*   (2006.01)
  *B01D 69/12*   (2006.01)
(52) U.S. Cl.
  CPC ...... *C02F 2303/08* (2013.01); *C02F 2305/08* (2013.01)

(56) References Cited

U.S. PATENT DOCUMENTS

2016/0312387 A1* 10/2016 Zhang ............... B82Y 10/00
2017/0292934 A1* 10/2017 Azpiroz ........... G01N 35/00029

OTHER PUBLICATIONS

Elimelech et al., "The Future of Seawater Desalination: Energy, Technology and the Environment", Science, Aug. 5, 2011, pp. 712-717, vol. 333, No. 6043, American Association for the Advancement of Science.
Elimelech et al., "The Future of Seawater Desalination: Energy, Technology and the Environment", Science, Aug. 5, 2011, pp. 712-717, vol. 333, No. 6043, American Association for the Advancement of Science. (PowerPoint).
Fritzmann et al., "State-of-the-art of reverse osmosis desalination", ScienceDirect, 2007, pp. 1-76, vol. 216, Elsevier B.V.
Eykens et al., "Influence of membrane thickness and process conditions on direct contact membrane distillation at different salinities", Journal of Membrane Science, 2016, pp. 353-364, vol. 498, Elsevier B.V.
Alkhudhiri et al., "Membrane distillation: A comprehensive review", Desalination, 2012, pp. 2-18, vol. 287, Elsevier B.V.
Mundhenk et al., "Metal corrosion in geothermal brine environments of the Upper Rhine graben—Laboratory and on-site studies", Geothermics, 2013, pp. 14-21, vol. 46, Elsevier Ltd.
Jang et al., "The manufacture of a transparent film heater by spinning multi-walled carbon nanotubes", Carbon, 2011, pp. 111-116, vol. 49, Elsevier Ltd.
Janas et al., "Rapid electrothermal response of high-temperature carbon nanotube film heaters", Carbon, 2013, pp. 457-463, vol. 59, Elsevier Ltd.
Wu et al., "Preparation of large-area double-walled carbon nanotube film and application as film heater", Physica E, 2009, pp. 77-81, Elsevier B.V.
Jung et al., "Transparent film heaters using multi-walled carbon nanotube sheets", Sensors and Actuators, 2013, pp. 176-180, vol. A 199, Elsevier B.V.
Gupta et al., "Visibly Transparent Heaters", ACS Applied Materials & Interfaces, 2016, pp. 12559-12575, No. 8, American Chemical Society.
Kang, et al., "Thickness-dependent thermal resistance of a transparent glass heater with a single-walled carbon nanotube coating", Carbon, 2011, pp. 1087-1093, vol. 49, Elsevier Ltd.
Jyoti et al., "Review on Pervaporation: Theory, Membrane Performance, and Application to Intensification of Esterification Reaction", Journal of Engineering, 2015, pp. 1-25, vol. 2015, Hindawi Publishing Corporation.
Ong et al., "Recent membrane development for prevaporation processes", Progress in Polymer Science, 2016, pp. 1-31, vol. 57, Elsevier Ltd.
Saeidi et al., "Hydrogenation of CO2 to value-added products—A review and potential future developments", Journal of CO2 Utilization, 2014, pp. 66-81, vol. 5, Elsevier Ltd.
Jadhav et al., "Catalytic carbon dioxide hydrogenation to methanol: A review of recent studies", Chemical Engineering Research and Design, 2014, pp. 2557-2567, vol. 92, Elsevier B.V.
Honig, "Ionization Potentials of Some Hydrocarbon Series", The Journal of Chemical Physics, Feb. 1948, pp. 105-112, vol. 16, No. 2, American Institute of Physics.
Parker, "Energetics of Electrode Reactions. II. The Relationship between Redox Potentials, Ionization Potentials, Electron Affinities, and Solvation Energies of Aromatic Hydrocarbons", Journal of the American Chemical Society, Jan. 7, 1976, vol. 98, No. 1.
Liu et al., "Carbon-Nanotube-Film Microheater on a Polyethylene Terephthalate Substrate and Its Application in Thermochromic Displays", Small, 2011, pp. 732-736, vol. 7, No. 6, Wiley-VCH Verlag GmbH & Co. KGaA, Weinheim.
Zhang et al., "The Road for Nanomaterials Industry: A Review of Carbon Nanotube Production, Post-Treatment, and Bulk Applications for Composites and Energy Storage", Small, 2013, pp. 1237-1265, vol. 9, No. 8, Wiley-VCH Verlag GmbH & Co. KGaA, Weinheim.
Dudchenko et al., "Organic fouling inhibition on electronically conducting carbon nanotube-polyvinyl alcohol composite ultrafiltration membranes", Journal of Membrane Science, 2014, pp. 1-11, vol. 468, Elsevier B.V.
De Lannoy et al., "A highly electrically conductive polymer-multiwalled carbon nanotube nanocomposite membrane", Journal of Membrane Science, 2012, pp. 718-724, vol. 415-416, Elsevier B.V.
Duan et al., "Polyaniline-Coated Carbon Nanotube Ultrafiltration Membranes: Enchanced Anodic Stability for In Situ Cleaning and Electro-Oxidation Processes", ACS Applied Materials & Interfaces, 2016, pp. 22574-22584, vol. 8, American Chemical Society.
Liu et al., "Bismuth-Doped Tin Oxide-Coated Carbon Nanotube Network: Improved Anode Stability and Efficiency for Flow-Through Organic Electrooxidation", ACS Applied Materials & Interfaces, 2013, pp. 10054-10066, vol. 5, American Chemical Society.
Janas et al., "Durability and surface chemistry of horizontally aligned CNT films as electrodes upon electrolysis of acidic aqueous solution", J Mater Sci, 2014, pp. 7231-7243, vol. 49, Springer Science+Buisness Media.
Weber et al., "Ohm's Law Survives to the Atomic Scale", Science, Jan. 6, 2012, pp. 64-68, vol. 335, No. 6064.
Kilic et al., "Steric effects in the dynamics of electrolytes at large applied voltages. II Modified Poisson-Nernst-Planck equations", Physical Review E, 2007, pp. 1-11, vol. 75, No. 021503, The American Physical Society.
Ayliffe et al., "Electric Impedance Spectroscopy Using Microchannels with Integrated Metal Electrodes", IEEE Journal of Microelectromechanical Systems, Mar. 1999, pp. 50-57, vol. 8, No. IEEE.
Randles, "Kinetics of Rapid Electrode Reactions", Mar. 5, 1947, pp. 11-19.
Lin et al., "Direct contact membrane distillation with heat recovery: Thermodynamic insights from module scale modeling", Journal of Membrane Science, 2014, pp. 498-515, vol. 453, Elsevier B.V.
He et al., "High water recovery in direct contact membrane distillation using a series of cascades", Desalination, 2013, pp. 48-54, vol. 323, Elsevier B.V.
Balogh et al., "Remote Joule heating by a carbon nanotube", Nature Nanotechnology, May 2012, pp. 316-319, vol. 7, Macmillan Publishers Limited.
Kaatze, "Complex Premittivity of Water as a Function of Frequency and Temperature", J. Chem. Eng. Data, 1989, pp. 371-374, vol. 34, American Chemical Society.
Zuo et al., "Energy efficiency evaluation and economic analyses of direct contact membrane distillation system using Aspen Plus", Desalination, 2011, pp. 237-244, vol. 283, Elsevier B.V.
Saffarini et al., "Technical evaluation of stand-alone solar powered membrane distillation systems", Desalination, 2012, pp. 332-341, vol. 286, Elsevier B.V.
Summers, et al., "Energy efficiency comparison of single-stage membrane distillation (MD) desalination cycles in different configurations", Desalination, 2012, pp. 54-66, vol. 290, Elsevier B.V.
Criscuoli et al., "Evaluation of energy requirements in membrane distillation", Chemical Engineering and Processing, 2008, pp. 1098-1105, vol. 47, Elsevier B.V.
Guillen-Burrieza, et al., "Experiemical analysis of an air gap membrane distillation solar desalination pilot system", Journal of Membrane Science, 2011, pp. 386-396, vol. 379, Elsevier B.V.

(56) References Cited

OTHER PUBLICATIONS

Winter, et al., "Desalination using membrane distillation: Experimental studies on full scale spiral wound modules", Journal of Membrane Science, 2011, pp. 104-112, vol. 375, Elsevier B.V.

Gingerich, et al., "Quantity, Quality, and Availability of Waste Heat from United States Thermal Power Generation", Environmental Science & Technology, 2015, pp. 8297-8306, vol. 49, American Chemical Society.

Lackovic et al., Three-dimensional Finite-element Anaysis of Joule Heating in Electrochemotherapy an in vivo Gene Electrotransfer, IEEE Transactions on Dielectrics and Electrical Insulation, Oct. 2009, pp. 1338-1347, vol. 16, No. 5, IEEE.

Sharqawy et al., "Thermophysical properties of seawater: a review of existing correlations and data", Desalination and Water Treatment, Apr. 2010, pp. 354-380, vol. 16, Desalination Publications.

\* cited by examiner

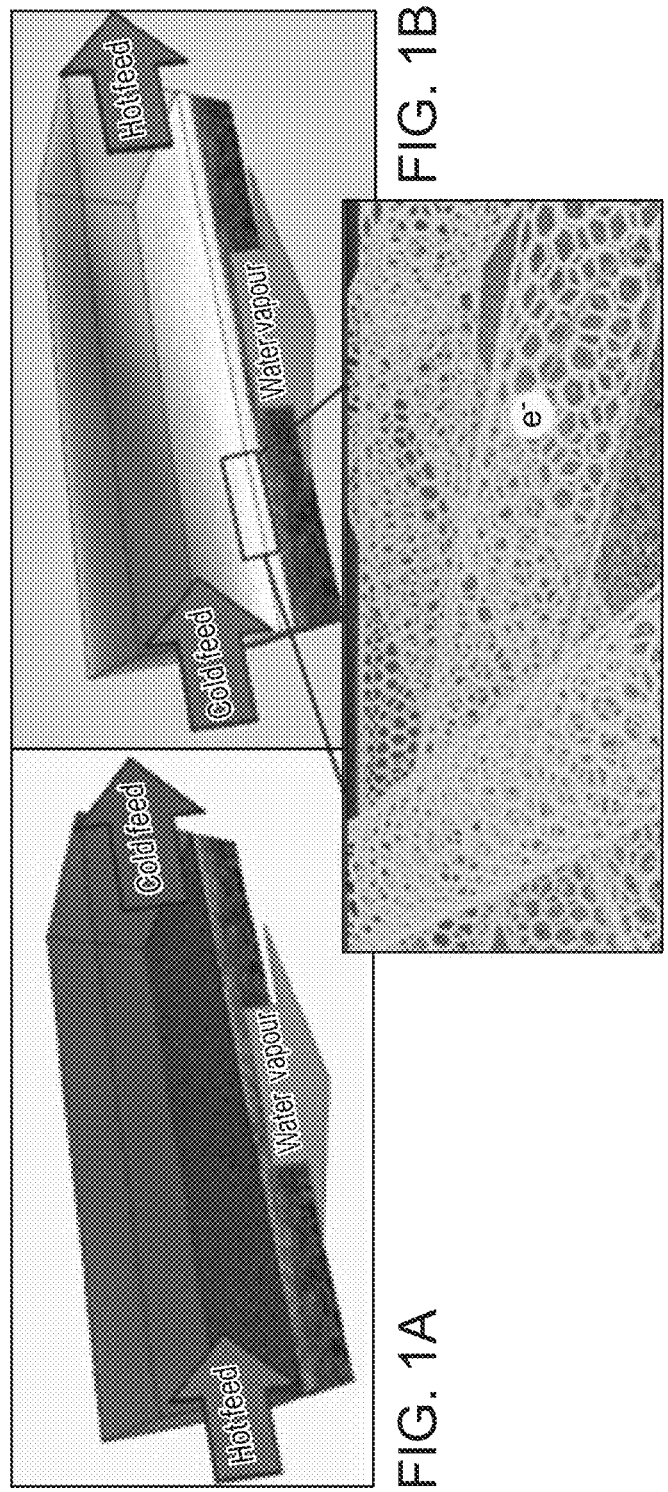

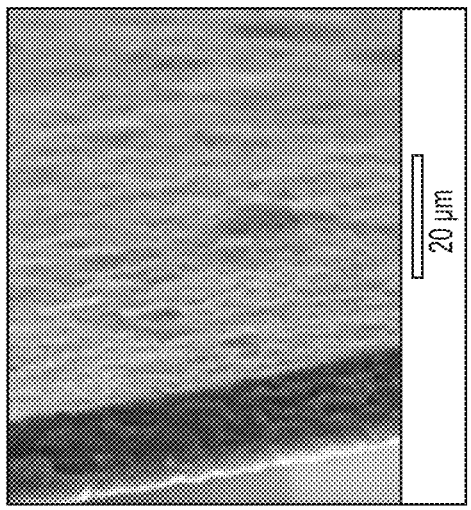
FIG. 2A
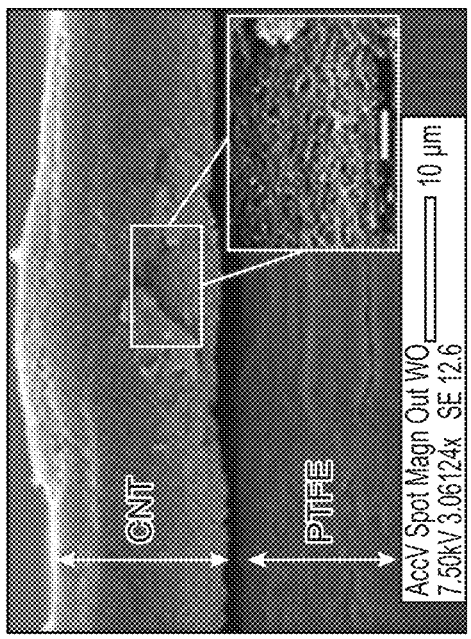
FIG. 2B
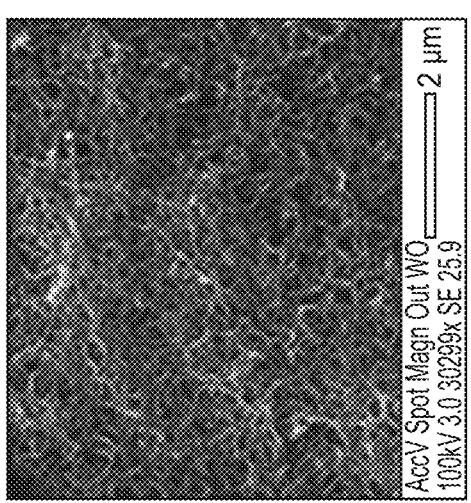
FIG. 2D
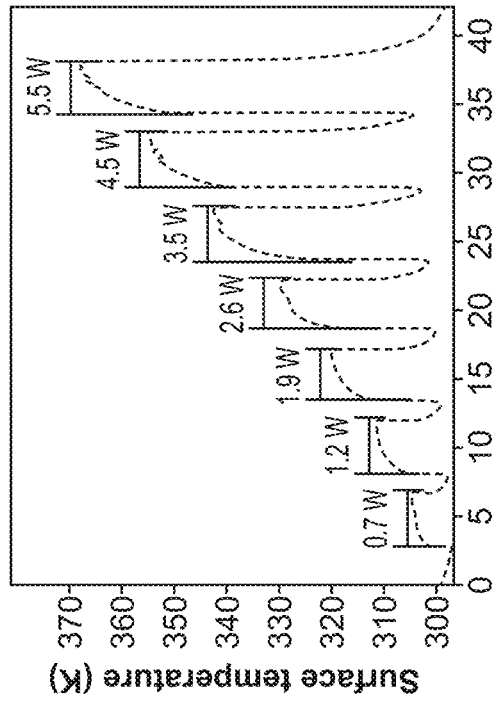
FIG. 2C
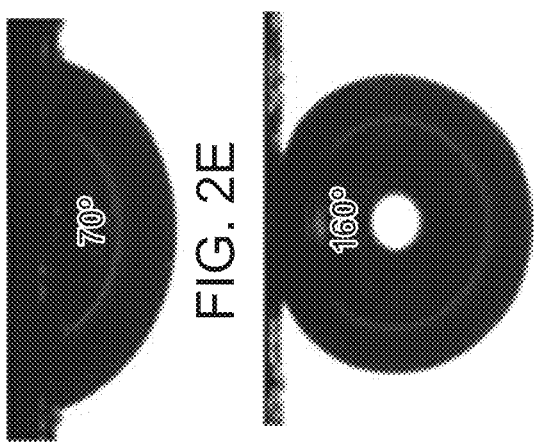
FIG. 2E
FIG. 2F
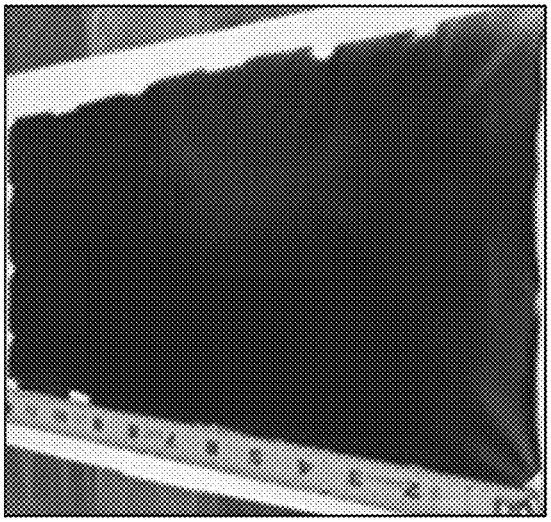
FIG. 2G

CONDUCTIVE THIN-FILMS FOR DIRECT MEMBRANE SURFACE ELECTROHEATING

CROSS-REFERENCES TO RELATED APPLICATIONS

This application claims priority under 35 U.S.C. § 119(e) to U.S. Provisional Application No. 62/527,953 filed on Jun. 30, 2017, the entire contents of which is incorporated herein by reference.

TECHNICAL FIELD

The present disclosure generally relates to conductive thin-films for direct membrane surface electroheating.

BACKGROUND DISCUSSION

Water shortages caused by population growth, urbanization and climate change and brine waste management are increasing challenges for coastal and inland regions, with high-salinity brines presenting a particularly challenging problem. These high-salinity waters require the use of thermally driven treatment processes, such as membrane distillation, which can suffer from high complexity and cost.

Although reverse osmosis (RO) is the de facto standard technology for desalination, RO is not capable of treating fluids with high osmotic pressures, such as produced water, and RO-generated waste brines. Thermal desalination processes, such as membrane distillation (MD), are the treatment method of choice for these brines, due to their relative insensitivity to salinity (FIG. 1A). In the MD process, a temperature gradient across a hydrophobic membrane (hot brine and cold distillate) drives the transport of water vapor across the membrane, while liquid water and dissolved salts are prevented from passing through. Unfortunately, these hot, high-salinity brines are highly corrosive, which makes heat management (for example, heat exchangers) in these systems expensive due to the need for corrosion-resistant metals, such as nickel alloys.

SUMMARY

In accordance with an exemplary embodiment, providing the thermal energy needed for water evaporation directly at the membrane/brine interface could significantly reduce the energy intensity and simplify material choice and system design of MD-based desalination processes. For example, a thin, porous and electrically conducting carbon nanotube (CNT) film deposited on the membrane surface, in direct contact with the brine, can be used as a Joule heater to drive the MD desalination process (FIG. 1B). Although CNT-based Joule heaters have been previously demonstrated, they were always used in non-ionizable environments, for example embedded in a shielding medium (polymer or glass) or used in air. In these past demonstrations, direct current (d.c.) was used to provide the energy to the CNT surface. However, the large electrical potentials needed to generate the power necessary for heating can lead to rapid electrochemical degradation of CNT films in an ionizable medium. Thus, a porous thin-film Joule heating element able to function in a highly corrosive and ionizable environment without impeding the performance of the membrane material itself could transform thermally driven separation and catalytic processes such as MD-based desalination, pervaporation and hydrocarbon hydrogenation.

The Joule heating effect occurs when the resistance of a conductor to electron flow leads to the conversion of the electron's kinetic energy to thermal energy. Previously known thin-film Joule heaters used materials such as indium tin oxide, CNTs and metal nanowires. These films were demonstrated in various applications, such as window defrosting and thermochromic displays. The relative low cost and the ability to form conductive and porous films makes CNTs an ideal material for use as a Joule heating element in thermally driven separation processes. However, previously known CNT Joule heaters have been demonstrated in low-ionizable conditions, where the application of the high voltages (10-20 $V_{pp}$) required to power the element did not ionize the surrounding media, which ensured the CNTs maintained their stability and heat-transfer properties. However, in ionizable mediums, such as high-salinity brines, the application of even low anodic potentials, for example, less than 2 $Volts_{d.c.}$ (<2 $V_{d.c.}$) to the CNT film can lead to surface charging, water splitting and rapid degradation. Although polymer coatings could be used to shield the CNTs from the environment, these coatings block the porous structure of the film and form an additional thermal barrier between the heated CNT network and the fluid. Thus, a method that prevents CNT degradation while maintaining the CNT porous structure and maximizing thermal transport between the heating element and the fluid would be highly desirable.

In accordance with an exemplary embodiment, a method is disclosed on how controlling the frequency of an applied alternating current at high potentials (for example, 20 $V_{pp}$ (peak-to-peak voltage) to a porous thin-film carbon nanotube (CNT)/polymer composite Joule heating element can help prevent CNT degradation in ionizable environments such as high-salinity brines. By operating at sufficiently high frequencies, these porous thin-films can be directly immersed in highly ionizable environments and used as flow-through heating elements.

In accordance with an exemplary embodiment, porous CNT/polymer composites can be used as self-heating membranes to directly heat high-salinity brines at the water/vapor interface of the membrane distillation element, achieving high single-pass recoveries that approach 100%, far exceeding standard membrane distillation recovery limits.

A method is disclosed for preventing carbon nanotube degradation in ionizable environments, the method comprising: immersing a porous thin-film nanotube (CNT)/polymer composite Joule heating element in an ionizable environment; and applying an alternating current at a frequency of at least 100 Hz to the porous thin-film nanotube (CNT)/polymer composite Joule heating element in the ionizable environment.

A method is disclosed of preparing a Joule heating element for ionizable media and desalination processes, the method comprising: preparing carbon nanotube films by sequential spray deposition of carbon nanotube (CNT) and polyvinyl alcohol (PVA) solutions on a porous polymeric membrane surface.

A porous thin-film nanotube (CNT)/polymer composite Joule heating element configured for use in an ionizable media or a desalination process is disclosed, the heating element comprising: a carbon nanotube film comprising carbon nanotubes (CNT) and polyvinyl alcohol (PVA) on a porous polymeric membrane surface.

BRIEF DESCRIPTION OF THE DRAWINGS

FIG. 1A-1B illustrate a comparison of classical and directly heated membrane distillation, and wherein FIG. 1A is a diagram of a classical MD process where a hot feed (brine) flows over one side of a hydrophobic membrane and a cold distillate stream flows over the other side, leading to a vapor pressure gradient across the membrane that drives water vapor from the hot, salty feed to the cold distillate, and FIG. 1B illustrates direct surface heating of a composite MD membrane composed of a porous CNT-based Joule heater and a hydrophobic porous support, and wherein the cold feed (brine) is heated on the membrane surface, which drives water vapor transport across the hydrophobic support into the distillate stream, leaving dissolved ions behind, and the inset of FIG. 1B illustrates a zoomed-in rendition of the thin-film CNT Joule heater structure on an MD membrane surface showing electron (e−) flow and heating.

FIGS. 2A-2G illustrate a spray-coated CNT-PVA porous self-heating films on PTFE supports, and wherein FIG. 2A is a SEM image of CNT-PVA film surface, FIG. 2B is a SEM image of CNT-PVA cross-section on PTFE support, with inset showing zoomed-in structure of CNT cross-section (scale bar, 2 μm), FIG. 2C is a SEM image of freestanding CNT-PVA film cross-section, FIG. 2D is an image of a large spray-coated membrane (30 cm by 15 cm; scale is in inches), FIG. 2E is a contact angle of air with PTFE surface (angle of 70°), FIG. 2F is a contact angle of air with CNT-PVA-coated PTFE membrane (angle of 160°), and FIG. 2G is a direct heating of the CNT structure under convective air flow with the application of electrical power.

FIGS. 3A-3G illustrate stability of CNT films under different electrical conditions, wherein FIG. 3A is an electron flow through a CNT network under direct current (d.c.) conditions in a non-ionizable environment, FIG. 3B is an electron flow through a CNT network under d.c. conditions in an ionizable environment, FIG. 3C is a Nyquist plot of real and imaginary impedance showing an increase in capacitive charging with increased salt content (symbols are measured values and solid lines show the fitted equivalent circuit); the applied frequency increased from right (0.3 Hz) to left (10 kHz), FIG. 3D is a Bode plot of absolute impedance (|Z|) and phase shift versus the applied frequency for immersed CNT networks in different salt solutions (symbols are measured values and solid lines show the fitted equivalent circuit), FIG. 3E is an equivalent circuit describing electron flow through CNT films and surrounding ionizable media during the application of a.c. current; the red dashed lines designate the electron path describing the degradation pathway of the CNT structure, with the red dashed box showing the circuit that was used to calculate the current transfer ratio between RP and EDL, FIG. 3F is a charge transfer ratios between polarization resistance and EDL calculated from fitted values at different salt concentrations, and FIG. 3G is a time-dependent degradation of CNT-PVA films under different applied frequencies at 100 g l$^{-1}$ of NaCl; an increase in real and imaginary impedance (the units for both are ohms) indicates degradation, while phase shift indicates surface charging.

FIGS. 4A-4F illustrate a demonstration of direct surface heating for brine desalination using MD, and wherein FIG. 4A is a direct heating of feed solution using titanium electrodes, with the brine acting as a heating element, FIG. 4B is a direct heating of membrane surface with a CNT-PVA porous network deposited on a hydrophobic MD membrane (both CNT-PVA network and titanium plates are immersed in brine), FIGS. 4C and 4D illustrate permeate flux and feed outflow temperature data for different cross-flow velocities with a brine concentration of 100 g l$^{-1}$ NaCl, FIG. 4E is a FEM simulation results showing the difference in permeate flux and outflow temperatures versus increasing cross-flow velocity of direct (CNT-PVA) heating (red line) and solution heating (blue line), FIG. 4F is a FEM simulation showing the difference between membrane surface temperatures for a direct solution heated system (heated with Ti plates only) (left) and a system heated using the CNT-PVA porous network (with Ti plates serving as the electrical contact points) (right) at a cross-flow velocity of 6.6 mm s$^{-1}$ and 100 g l$^{-1}$ of NaCl.

DESCRIPTION OF EMBODIMENTS

A method and system are disclosed for fabrication of porous thin-film CNT Joule heaters, and their stable operation in highly ionizable environments. By using alternating currents (a.c.), where the polarity of the applied potential is rapidly switched, power can be provided to the porous CNT film such that the CNT Joule heaters can operate for extended periods of time in high-salinity environments with no degradation. Utilizing electrical impedance spectroscopy (EIS), the stability of the CNT structure was studied under the application of a.c. potentials at different frequencies and this data was used to develop an equivalent circuit that captures the electron pathways through the CNT structure and surrounding saline water as a function of the frequency. In addition, it was further demonstrated that high-frequency a.c. can be used to heat the CNT films, generating the needed thermal driving force at the water/vapor interface in an MD process for desalinating high-salinity brines.

Self-Heating CNT/Polymer Composite MD Membranes

In accordance with an exemplary embodiment, a method is disclosed that uses layer-by-layer spray coating of carboxylated CNTs and polyvinyl alcohol (PVA) to construct a highly conductive, hydrophilic and porous thin film deposited on a hydrophobic porous membrane support (FIGS. 2A-2D). The spray-coating process aerosolizes a CNT suspension and can help prevent the CNTs from entering the support membrane's pore structure during deposition, which helps preserve the support membrane's separation properties (porosity, hydrophobicity, pore size). In accordance with an exemplary embodiment, the CNT layer is immobilized by crosslinking the carboxyl and hydroxyl surface groups of CNTs with PVA, forming a hydrophilic and robust conductive thin film. Using this approach, CNT-PVA films were deposited onto a membrane, for example, a large (450 cm$^2$), hydrophobic 0.2 μm polytetrafluoroethylene (PTFE) membranes, with a CNT film thickness of 15±2 μm, electrical conductivity (in water) of 1,700±200 S m$^{-1}$, and a highly hydrophilic surface (air contact angle of 160±4°) (FIG. 2b-f). While membrane distillation (MD) processes require a hydrophobic membrane that prevents liquid water (and dissolved ions) from passing through, the distinct dual-layer structure of these composite hydrophilic-hydrophobic membranes allows them to function as standard MD membranes, where the vapor formation occurs at the PTFE/CNT interface, achieving salt rejection in excess of 99%.

Figure 3A:
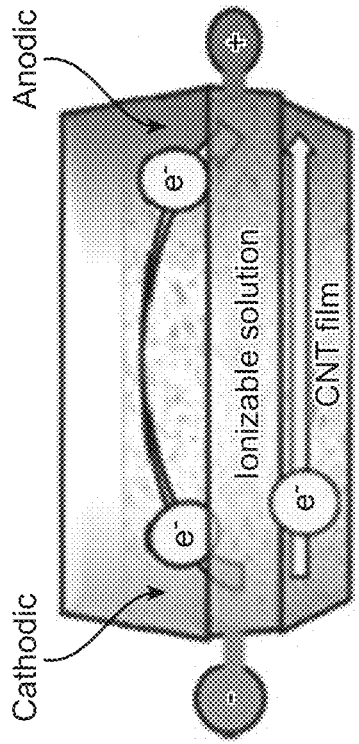
Figure 3C:
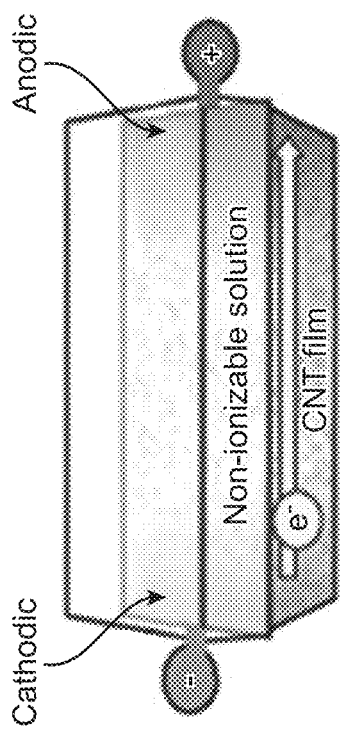
Figure 3B:
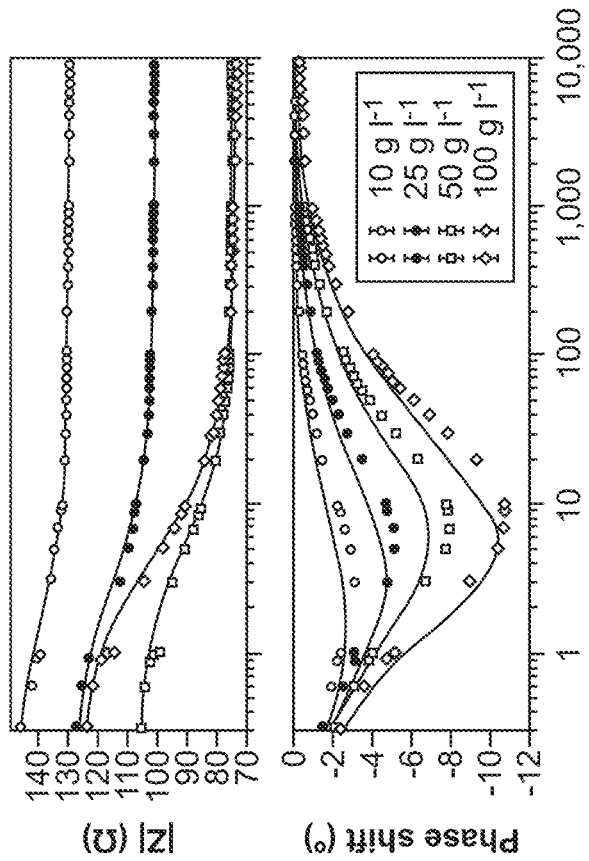

The application of a direct current (d.c.) potential across a membrane coupon (4 cm$^2$) under convective air cooling resulted in immediate surface heating, with an increase in applied power leading to higher surface temperatures (FIG. 2G). In air, the surface temperature reached 368.15 K when 5.5 W of power was applied to the membrane surface (1.375 W cm-2). However, the application of a d.c. potential also leads to the formation of a potential gradient across the membrane with anodic and cathodic regions (FIG. 3A). When the CNT film is immersed in a difficult-to-ionize medium (for example, air), the electrons will only flow through the CNT film, leading to heating. However, if the CNT film is immersed in an ionizable solution (for example, salt water) the electrons can flow through two pathways—through the CNT structure, where most of the energy is dissipated as heat, or through the ionized solution, leading to surface charging and electrochemical reactions commonly observed in electrochemical cells (FIG. 3B). In CNT-based anodes, it has been observed that the application of potentials >1.2 $V_{d.c.}$ in ionizable solutions leads to rapid electrooxidation of the CNT network. However, to achieve high surface temperatures, high electrical potentials (>10 $V_{d.c.}$) must be applied across the CNT network, making d.c. potentials not appropriate for operation in ionizable environments.

In an electrochemical cell, the application of an electrical potential forces electrons to flow from the cathode to the anode, with the electrons flowing through the path of least resistance. This is a multi-step process, where first the electrons form an electrical double layer (EDL) (surface charging), followed by electrons participating in electrochemical reactions. For EDL formation, the electrons only have to overcome the resistance of the electrode material, which can be orders-of-magnitude lower than that of the media, leading to charge accumulation on the electrode surface (negative on cathode and positive on anode). Once the EDL is fully formed (that is, the charge is balanced by counter ions in the solution), and if sufficient potential is applied, electrons and holes can participate in electrochemical reactions, including electrooxidation of the CNT network on the anodic side of the cell. Thus, if the EDL layer can be prevented from fully forming, it would be possible to prevent electrooxidation of CNTs.

Figure 3D:
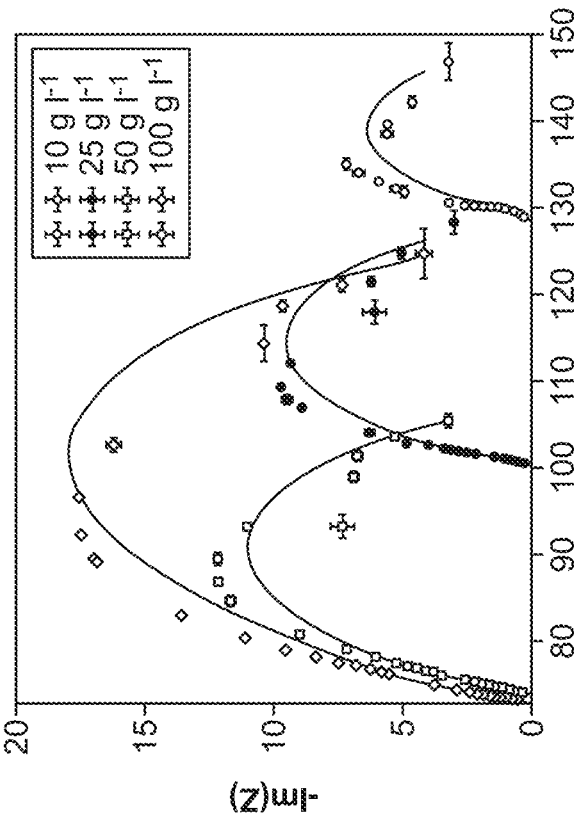

EDL formation can be controlled through rapid switching of the applied polarity (that is, a.c. potential) that leads to swift charging and discharging of the EDL layer. The overall charge of the EDL decreases with increasing frequency, which potentially prevents electrochemical reactions. Measuring the phase shift between the applied potential and the current (using EIS), allows for the determination of the real and imaginary impedance of the system. The real impedance describes the resistance of the system to electron flow (that is, resistive behavior), whereas the imaginary part describes the resistance to change in electron flow (that is, inductive or capacitive behavior). Spray-coated CNT-PVA films were immersed into NaCl solutions (10-100 g l$^{-1}$), and an a.c. potential (20 $V_{pp}$) was applied at different frequencies (0.3-10,000 Hz). Nyquist plots generated under different solution concentrations revealed a classic semi-circle shape with negative imaginary impedances attributed to capacitive charging (FIG. 3C). The increase in the size of the semi-circle and the imaginary impedance with salt concentration is indicative of increasing capacitance (FIG. 3C). These results are in line with standard EDL formation theory that predicts increasing capacitance in the presence of increasing electrolyte concentrations. A Bode plot of EIS data demonstrates that decreasing operating frequencies led to an increase in the absolute impedance of the system (|Z|), indicating that electrons have to flow through a path of higher resistance as the frequency decreases (FIG. 3D). This increase in absolute impedance is the result of the EDL formation at low frequencies (indicated by increasing phase shift, that is, capacitive charging), which forces electrons to participate in redox reactions (FIG. 3D). Thus, the formation of the fully charged EDL can be prevented through the application of sufficiently high a.c. frequencies, with the onset of EDL formation being dependent on the solution ionic strength (higher salt concentrations leads to onset at higher frequencies). By eliminating the formation of the EDL, CNT-degrading electrochemical reactions can be prevented, which is reflected by the minimized |Z| values at sufficiently high frequencies (FIG. 3D).

Figure 3E:
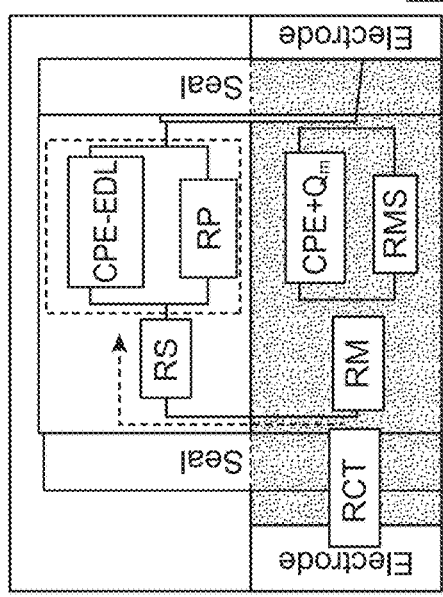

The oxidation of the CNTs can be understood by following the electron pathway through the CNT network immersed in a saline solution, as described using an equivalent circuit (FIG. 3E). The circuit is composed of two parallel sub-circuits in series with a dry CNT contact resistance RCT (resistor). The first sub-circuit describes the electron pathway through the immersed CNT network, where RM (resistor) describes the dry CNT resistance in series with a constant phase element (CPE-$Q_m$, non-ideal capacitor) that describes pseudocapacitance of the CNT network, in parallel with the wet CNT resistance (RMS, resistor), which is the result of CNT hydration and disruption of the percolating network. The second sub-circuit (FIG. 3E, surrounded by dashed red line) describes the electron pathway through the solution, where RS (a resistor) describes the solution resistance, which is in series with a constant phase element (CPE-EDL, non-ideal capacitor) describing EDL formation in parallel with a polarization element (RP, a resistor) that describes the resistance to charge transfer (that is, electrochemical reactions). The values in the developed circuit were acquired via fitting of the circuit to the EIS data with the fits being presented with solid lines on the Nyquist and Bode plots, where the goodness of the fit was judged by the $R^2$ value acquired from fitting of real and imaginary impedance data, with $R^2$>0.92 for all fits.

Figure 3F:
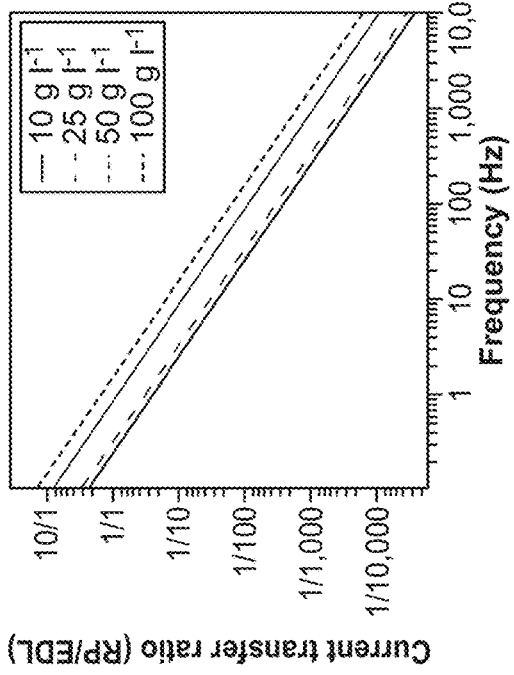

In an exemplary circuit, electrons can charge the surface (that is, lead to EDL formation (CPE-EDL)) or transfer from the CNT network to the solution and participate in oxidation/reduction reactions (that is, pass through the RP circuit element), similar to the Randles circuit (FIG. 3E). Thus, for each frequency tested, the ratio between the current flowing to the polarization element and the current flowing to the EDL can be used to gauge the CNT degradation rate, with higher ratios (that is, more electrons participating in redox reactions) corresponding to increased CNT degradation rates, and lower ratios corresponding to more effective surface heating. Using the values acquired from the equivalent circuit, the current transfer ratio between the RP element and EDL element were calculated. The current transfer ratio is a strong function of operating frequencies and a moderate function of salt content, where an increase in frequency leads to a rapid reduction in the current ratio, while increase in salt content raises the ratio (FIG. 3F). For example, the ratio at the low frequency of 0.1 Hz (10 g l$^{-1}$) is 4/1 implying that for every electron used to charge the EDL layer, four electrons passed through the polarization element, potentially participating in an electrochemical reaction. In contrast, at 1 kHz, the ratio reduces to 1/10,000 (FIG. 3F). Thus, through use of a.c. potentials with moderate frequencies to power the CNT Joule heating elements, it is possible to significantly reduce, or even prevent the degradation of the CNT network.

Figure 3G:
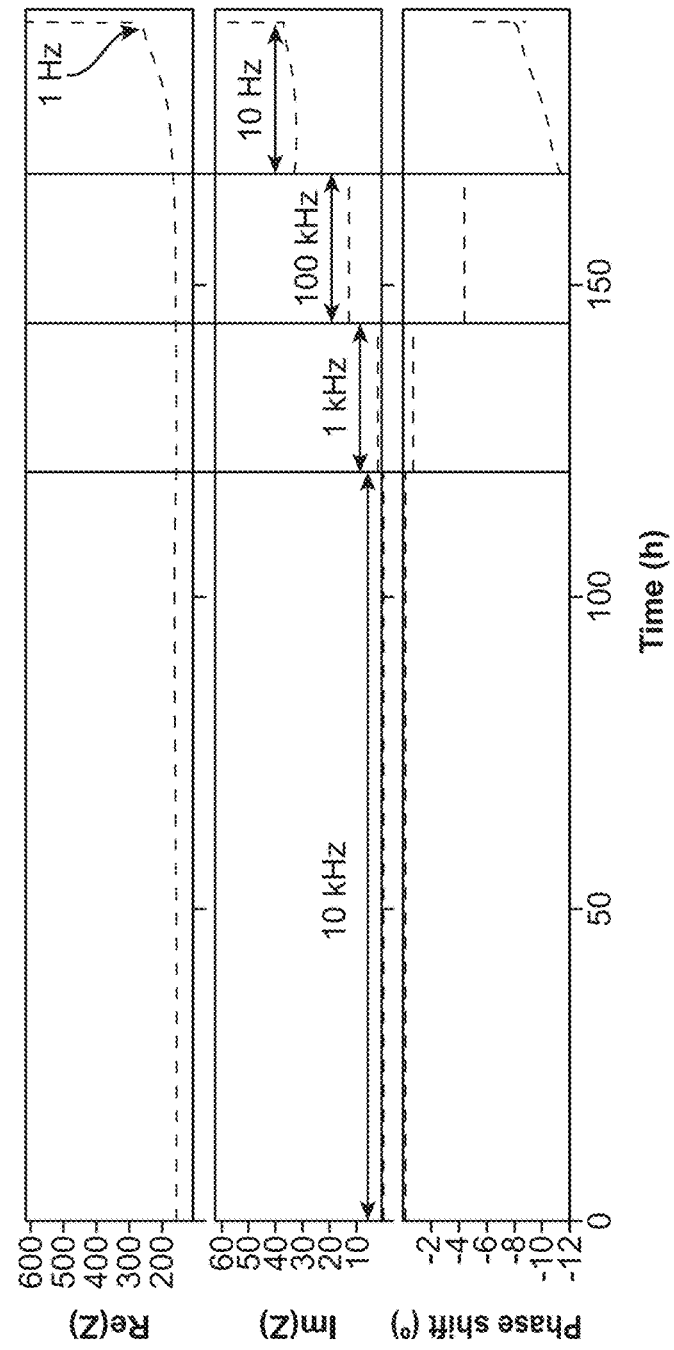

Time studies were performed to confirm the results of the EIS analysis, where an increase in real impedance over time was used as an indicator of CNT degradation. The application of an a.c. potential with a frequency of 10 kHz and 20 $V_{pp}$ to a CNT network immersed in 100 g l$^{-1}$ of NaCl showed no degradation after 125 h of continuous operation (FIG. 3G). At 1 kHz and 100 Hz no increase in real impedance was observed, although a phase shift of −0.7° and −4.4° was measured, respectively. At these frequencies, partial surface charging resulted in current transfer ratios of 3/2,000 and 3/200, respectively (FIG. 3F). Importantly, these long-term studies demonstrated that at these current ratios, redox reactions are either insignificant or reversible due to the constantly switching polarity (oxidation↔reduction). When the frequency was further reduced to 10 Hz the phase shift increased to −11°, indicating large EDL formation and the charge transfer ratio increased beyond 1/10 (FIG. 3G). Under these conditions, the real impedance (that is, the electrical resistance of the CNT network) increased by 50% after 24 hours (h) due to severe CNT network degradation. Operating at 1 Hz led to nearly complete CNT network failure in less than an hour (FIG. 3G). These results are in agreement with EIS measurements, which predicted large EDL formation and high current transfer ratios at low operating frequencies (<10 Hz) leading to rapid CNT degradation. Furthermore, the EIS measurements showed that EDL formation and current transfer ratios can be significantly reduced when operating above 100 Hz, where no CNT degradation was observed during the time studies. These results demonstrate that CNT films can be directly heated in highly ionizable environments using moderate frequency a.c. and remain stable for long periods of time.

Porous CNT Joule Heating in MD

Figure 4A:
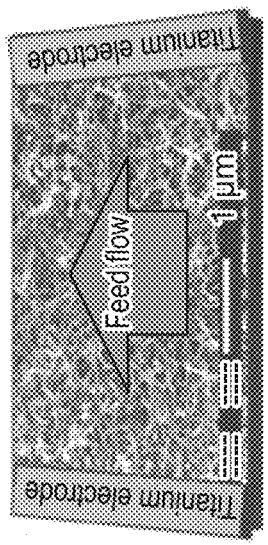
Figure 4B:
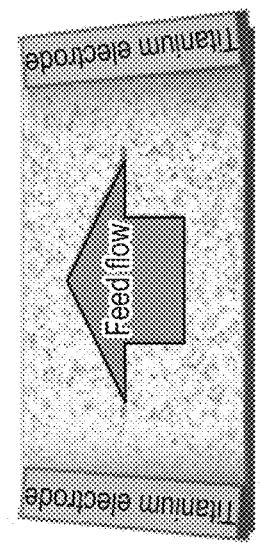
Figure 4C:
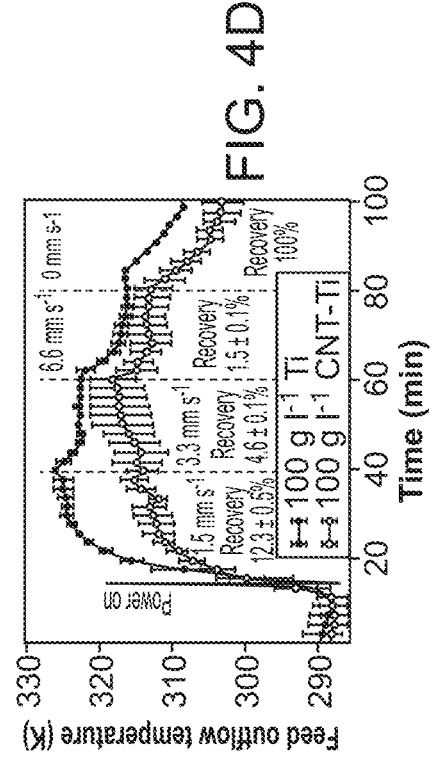
Figure 4D:
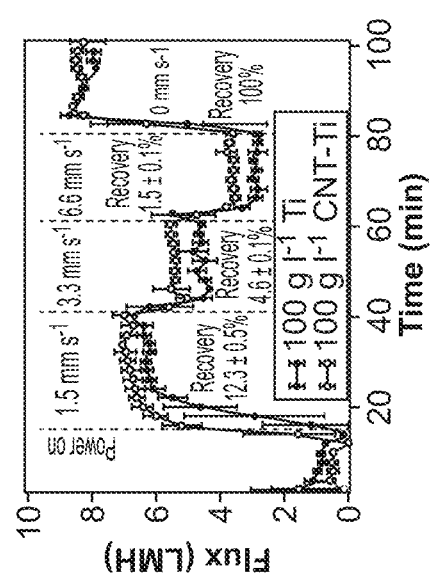

Direct heating of the feed stream in MD systems can be accomplished through the application of an electrical potential across the feed channel, where the conductive saline solution or the CNT network can be used as the Joule heating element (FIGS. 4A and 4B). While the saline feed could be used as the heating element during direct feed heating, the application of the high potentials needed to drive the heating process to the titanium plates leads to their rapid corrosion (even when a high-frequency (10 kHz) potential is applied). A detailed investigation of this corrosion process was conducted using EIS, scanning electron microscopy and energy-dispersive X-ray spectroscopy analysis (Supplementary Information). Thus, this heating approach is not suitable for long-term operations, and is only presented here as a control. Furthermore, using saline water as a heating element does not allow for the direct delivery of thermal energy to the water/membrane interface, resulting in energy losses to the bulk feed. Using a custom-built MD cell, the feed stream was directly heated inside the module using either titanium electrodes, or CNT-PVA membranes. The application of electrical power (50 W) to the cell resulted in a rapid increase in permeate flux and an increase in feed outflow temperatures when treating a high-concentration brine (100 g l$^{-1}$) (FIGS. 4D and 4D); salt rejection in these experiments exceeded 99%. Cross-flow velocity had a strong impact on single-pass recovery rates, with the system achieving a recovery rate of 12.3±0.5%, 4.6±0.1% and 1.5±0.1% at 1.5 mm s$^{-1}$, 3.3 mm s$^{-1}$ and 6.6 mm s$^{-1}$, respectively (FIG. 4C). These low cross-flows had to be used due to the very short path-length of the experimental cell (10 cm). Higher cross-flows would remove heat out of the cell, not allowing it to be used to drive vapor formation. Thus, in longer path-lengths, typically used in real-world applications (1-16 m), extremely high single-pass recoveries could be achieved with higher cross-flow velocities. When the velocity was set to zero, 100% theoretical recovery could be achieved. By decoupling heat delivery from the flow rates, single-pass recoveries using self-heating membranes far exceed the theoretical maximum single-pass recovery (6.5% at a ΔT of 40° C.) in classic MD systems. Direct heating with the CNT structure resulted in higher permeate fluxes at moderate cross-flow velocities of 3.3 and 6.6 mm s$^{-1}$, demonstrating 20±5% and 35±5% improvement over the bulk feed heating using Ti plates alone (FIG. 4C). The higher permeate flux achieved with the CNT-PVA structure is the result of direct surface heating, which reduced the thermal losses to the bulk feed and maintained a higher quanta of thermal energy for vapor formation resulting in lower feed out-flow temperatures. (FIGS. 4C and 4D). Remote Joule heating, where the medium surrounding the CNTs is heated through direct energy transfer from the electrons in the CNTs to the vibrational modes of surrounding molecules, could be contributing to the observed water heating. However, this was not readily distinguished between the contribution of this phenomenon and standard resistive heating. For example, remote ionic heating (dielectric heating) is unlikely to contribute significantly to the heating effect, as this heating typically requires frequencies in the GHz range to heat water.

Figure 4E:
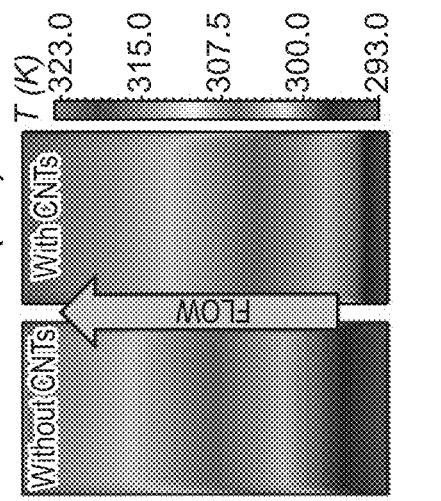
Figure 4F:
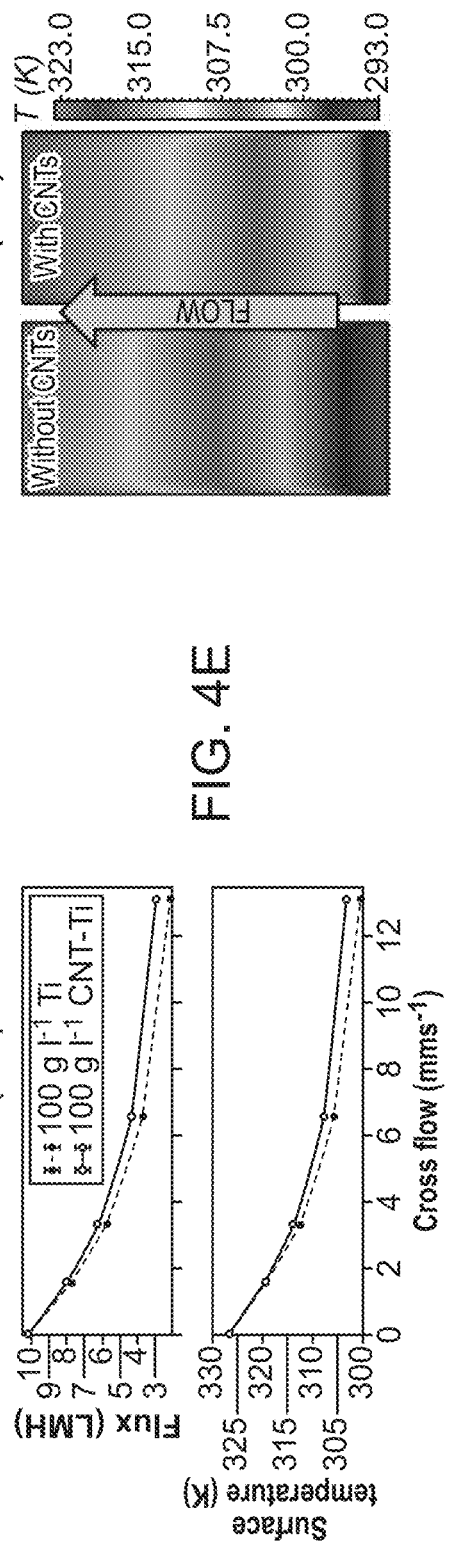

Simulations of heat generation and transfer process within the MD cell, done using a finite-element method (FEM), agreed with experimental results, demonstrating that direct surface heating using the porous CNT-PVA structure resulted in higher permeate fluxes, higher membrane surface temperatures and lower out-flow temperatures (FIGS. 4E and 4F). The results from MD experiments and FEM simulations demonstrate that a CNT-PVA Joule heating element coupled to a hydrophobic MD membrane allows for direct heating of water at the membrane surface even in highly saline solutions, achieving high single-pass recoveries, and maintaining thermal energy at the vapor-forming interface. Finally, the CNT-PVA membranes were able to achieve gain output ratio (GOR) values between 0.48±0.02 and 0.55±0.01 for 100 g l$^{-1}$ NaCl solution. These GOR values are similar to GOR values reported by previous MD studies using the PTFE support membranes used in our work. The energy consumption of our desalination process with no heat recovery is 4,495±71 kJ kg$^{-1}$ (1.25±0.02 kWh kg$^{-1}$) when treating 100 g l$^{-1}$ NaCl solution (approximately 3 times more concentrated then seawater). With heat recovery from the feed and permeate (excluding latent heat), the energy requirement decreases to 4,049±23 kJ kg$^{-1}$ (1.12±0.01 kWh kg$^{-1}$), which is in line with values reported by other MD studies.

Methods

CNT films were prepared via sequential spray deposition of CNT and PVA solutions onto a porous polymeric membrane surface. The CNT suspension was prepared by suspending 1 g l$^{-1}$ of multiwalled CNTs functionalized with carboxylic groups (Cheaptubes Inc.) and 10 g l$^{-1}$ of dodecylbenzenesulfonic acid (DDBS) (Fisher Scientific) in deionized (DI) water. The suspension was sonicated with a horn sonicator (Branson) for 30 min in an ice bath and then centrifuged at 11,000 g for 10 min, after which the supernatant was collected and used as is. The PVA solution was prepared by first dissolving 1 wt % PVA (Fisher Scientific) in DI water at 368.15 K, followed by dilution to 0.1 wt % with DI water before spray deposition.

Spray coating was accomplished using an in-house built spray coater with two axes of movement: a roll stage that moved the substrate (a 0.2 μm PTFE microfiltration membrane (Sterlitech)) at a rate of approximately 1 mm s$^{-1}$, and a spray-head stage equipped with two spray nozzles that moved across the membrane at rate of 400 mm s$^{-1}$, and was elevated 10 cm above the membrane surface. The spray nozzles (Harbor Freight) were air driven using house air at 1.37 bar. The injection of CNT or PVA solution into the air stream was controlled with an injection needle. The CNT and PVA solution were delivered to the nozzles from graduated cylinders using centrifugal pumps, allowing for precise monitoring of the volume utilized during the spray coating. The substrate surface was heated to 333.15 K using an air heater to facilitate solvent (water) evaporation. The 0.2 μm PTFE membrane substrate was sprayed with 2.9 ml cm$^{-2}$ and 0.015 ml cm$^{-2}$ of CNT and PVA solution, respectively. The membrane was then rinsed with DI water for an hour removing excess DDBS. The CNT-PVA network was cross-linked in 0.5 vol % glutaraldehyde (Fisher Scientific) and 1 vol % of hydrochloric acid (Fisher Scientific) solution, and heated to 70° C. for 1 hour. Finally, the membrane was dried at 363.15 K for 15 min and used as is.

The membrane surface was imaged using an SEM (Tescan USA, Inc., FEI), and air bubble contact angles were measured using a goniometer with an inverse cell (Ramé-hart Instrument Co.). Wet membrane conductivity was measured by first soaking the membrane in DI water and then measuring conductivity with a four-point conductivity probe (Veeco). The EIS experiments were performed by placing the membranes into an in-house built electrochemical cell. Titanium electrodes were placed at the ends of a 2×1 cm membrane coupon, and were sealed with vacuum grease and plastic covers. The resulting cell had an active area of 100 mm$^2$ with a 3.175-mm-wide channel and was immersed into the salt solution. The power to the cell was supplied using a Rigol DG1022 waveform generator, while the voltage and current were measured using Rigol DS1054z oscilloscope (RIGOL Technologies Inc.). The waveform generator as well as the oscilloscope were controlled using custom software that could perform standard EIS measurements, acquiring waveforms with 300,000 data points during EIS measurements and 30,000 data points during time studies. In all experiments, 10 oscillation periods were recorded and a 20 $V_{pp}$ a.c. sine wave was used. The fitting of the developed circuit was accomplished using nonlinear least square regression.

The MD experiments were performed using a fully instrumented and automated system operating in vacuum-assisted sweep-gas mode. A modified MD cell with a classical layout for feed (length, 10 cm; width, 4.5 cm; height, 1.0 mm) and distillate channels (length, 10 cm; width, 4.5 cm; height, 4 mm) was used. Feed was pumped through the system using a peristaltic pump (Greylor Company), while the air (on the distillate side) was pumped at a rate of 30 l min$^{-1}$ while applying a vacuum pressure of less than 12.7 mm Hg using a vacuum pump (Cole-Parmer). Salt rejection was measured using a conductivity meter (Thermo Fisher Scientific Inc.). The permeate flux was measured by measuring the change of the feed tank weight in real time using a scale (Fisher Scientific) and the software written in python. Power to the feed channel was delivered through two titanium shim electrodes (0.005-inch-thick) placed in parallel with the fluid flow, and were sealed with a gasket protruding 0.1 mm into the feed. The power to the electrodes was delivered using an in-house built power source that used a digital d.c. power supply (Shenzhen Korad Technology Co.), an in-house built H-bridge, and a DG1022 waveform generator. The H-bridge was built with IRF640 and IRF9630 metal-oxide-semiconductor field-effect transistor (Vishay Americas), and was switched using the DG1022 waveform generator with a square wave at 10 kHz. The power delivery to the cell was controlled through custom-written software that monitored voltage and current delivery to the cell using the DS1054z oscilloscope. The software adjusted the voltage supplied by the d.c. power supply to the H-bridge, maintaining constant power delivery regardless of operating conditions. The surface temperature of a CNT-coated membrane was measured with an IR thermometer (Testo Inc.), the membrane was placed 10 cm away from a fan flowing air at 125 cubic feet per minute (Thermo Cool Corp.) with power being supplied by the same set-up as discussed above. Single-pass recovery (SPR), defined as the percentage of desalinated water that is recovered from the feed (brine), as the feed is flowing through the membrane module, was calculated using:

$$SPR = \frac{Q_{feed} - Q_{pf}}{Q_{feed}} \times 100\% \qquad (1)$$

where $Q_{feed}$ is the feed flow rate and $Q_{pf}$ is permeate flowrate.

FEM simulations were carried out using the FENICS project software package. The calculation simulated conditions inside the feed channel with dimensions identical to the experimental flow cell. The meshes used for the calculations were made up of 24,453 vertices and 121,860 cells, and 24,520 vertices and 46,121 cells for experimental cell and scaled modules, respectively. The simulation was split into three calculation steps: (1) a solution for electrical potential distribution in the cell using equation (2), where V is the voltage and σ is the electrical conductivity of the media; (2) following the solution to the potential distribution, the classical incompressible Navier-Stokes equation (equation (3)) was solved, where ρ is density of the fluid, u is velocity of the fluid, μ is fluid viscosity and p is the pressure; (3) once the potential distribution and velocity profiles were known, a conductive and convective heat transfer equation (equation (4)) with a Joule heating source was solved. Here, k is the conductive heat transfer coefficient, T is the surface temperature, $C_p$ is the heat capacity of fluid, and σ×|∇V$^2$| is the Joule heating term.

$$\nabla(\sigma \times \nabla V) = 0 \qquad (2)$$

$$\rho \times u \nabla u - \mu \Delta u + \nabla p = 0 \qquad (3)$$

$$k \nabla^2 T + C_p \times \rho \times u \times \nabla T = \sigma \times |\nabla V^2| \qquad (4)$$

The simulations assumed that the CNT film was a solid structure, which had the same thermal properties as water and uniform electrical conductivity of 1,700 S m$^{-2}$. This assumption is valid since a large fraction of the volume of the CNT-PVA structure is occupied by water. The Navier-Stokes calculations assumed that the distillate flux would have negligible impact on the velocity profile and thus no slip conditions were used on all channel walls, except at the inflow and outflow. The heat transfer calculations assumed that the thermal conductivity of the membrane did not change and had a value of 0.03 W m$^{-1}$ K$^{-1}$, vapor permeability of 0.3 LMH K$^{-1}$, and thickness of 150 μm. It was further observed during experiments that the distillate channel temperature did not significantly change and thus a constant temperature of 293.15 K was used. The thermal conductivity, heat capacity and enthalpy of vaporization correlations acquired, and accounted for impact of salinity and temperature. FEM simulations of a large-scale system were performed in a two-dimensional cell with two 5-m-long modules in a series, where the first module was self-heated and the second module was not (that is, a standard MD module). The modules simulated a cross-section of an MD element with a 1-mm-high by 1-m-wide flow channel. Power input into the heated module was 120 and 240 kW. The feed was simulated with 25 g l$^{-1}$ of NaCl and the enthalpy of vaporization and heat capacity were assumed to remain constant throughout the length of the module.

In accordance with an exemplary embodiment, porous CNT-PVA Joule heaters were fabricated and demonstrated that the CNT-PVA Joule heaters could be directly heated in highly corrosive and ionizable environments, while showing no degradation in performance even when exposed to very high potentials (20 $V_{pp}$). The CNT-PVA Joule heater was then used to desalinate high-salinity brines using an MD process. The stability of the CNT-PVA network was studied using EIS, which revealed that the formation of a fully charged EDL can lead to electrochemical reactions and CNT degradation. The EIS results demonstrated that EDL formation and overall system impedance is a strong function of the a.c. frequency, where operation at frequencies >100 Hz (at NaCl concentrations of 100 g $l^{-1}$) will limit the charging of the EDL and mitigate CNT electrooxidation. The developed CNT-PVA Joule heaters were then used in an MD-based desalination process, operating at 10 kHz without degradation, demonstrating direct feed heating at the membrane surface and achieving exceptionally high single-pass recovery of up to 100%, which exceeds the theoretical maximum predicted for standard MD processes. The developed porous CNT-PVA Joule heaters have demonstrated great potential for the treatment of highly saline brines, potentially leading to simpler MD system designs, and allowing for significant improvement of most thermally driven processes in reactive, ionizable environments by eliminating the need for bulk feed heating. Finally, recent studies have demonstrated that waste heat does not contain enough energy to drive anything but small-scale on-site thermal processes. Thus, the notion that waste heat can be utilized for large-scale desalination may be unrealistic under most circumstances. However, the direct-heated MD process described here could be coupled to renewable energy sources, such as photoelectric panels, which would reduce the carbon footprint and increase the sustainability of the technology.

The detailed description above describes conductive thin-films for direct membrane surface electroheating. The invention is not limited, however, to the precise embodiments and variations described. Various changes, modifications and equivalents can be effected by one skilled in the art without departing from the spirit and scope of the invention as defined in the accompanying claims. It is expressly intended that all such changes, modifications and equivalents which fall within the scope of the claims are embraced by the claims.

What is claimed is:

1. A method for preventing carbon nanotube degradation in ionizable environments, the method comprising:
    immersing a porous thin-film carbon nanotube (CNT)/polymer composite Joule heating element in an ionizable environment;
    applying an alternating current at a frequency of at least 100 Hz to the porous thin-film nanotube (CNT)/polymer composite Joule heating element in the ionizable environment; and
    wherein the porous thin-film carbon nanotube (CNT)/polymer composite Joule heating element acts as a resistor as the alternating current is applied through the porous thin-film nanotube (CNT)/polymer composite Joule heating element.

2. The method according to claim 1, further comprising: applying the alternating current at the frequency of at least 1000 Hz to the porous thin-film carbon nanotube (CNT)/polymer composite Joule heating element in the ionizable environment.

3. The method according to claim 1, further comprising: applying the alternating current at the frequency of between 100 Hz and 10,000 Hz to the porous thin-film carbon nanotube (CNT)/polymer composite Joule heating element in the ionizable environment.

4. The method according to claim 1, further comprising: applying the alternating current at the frequency of between 1000 Hz and 10,000 Hz to the porous thin-film carbon nanotube (CNT)/polymer composite Joule heating element in the ionizable environment.

5. The method according to claim 1, further comprising: applying the alternating current at 20 Vpp (Voltage peak-to-peak).

6. The method according to claim 1, wherein the ionizable environment is a membrane distillation (MD) desalination facility, the method further comprising:
    heating a surface of the porous thin-film carbon nanotube (CNT)/polymer composite Joule heating element.

7. The method according to claim 6, further comprising: flowing salinity brine through the surface of the porous thin-film carbon nanotube (CNT)/polymer composite Joule heating element.

8. The method according to claim 1, wherein the porous thin-film carbon nanotube (CNT)/polymer composite Joule heating element is formed by:
    preparing carbon nanotube films by sequential spray deposition of carbon nanotube (CNT) and polyvinyl alcohol (PVA) solutions on a porous polymeric membrane surface.

9. The method according to claim 1, wherein the porous thin-film carbon nanotube (CNT)/polymer composite Joule heating element is a hydrophilic-hydrophobic membrane.

10. A method of preparing a Joule heating element for ionizable media and desalination processes, the method comprising:
    preparing a carbon nanotube (CNT) solution by suspending multiwalled CNTs functionalized with carboxylic groups and dodecylbenzenesulfonic acid (DDBS) in deionized (DI) water and sonicating the suspension in an ice bath and then centrifuging the suspension and collecting a supernatant; and
    preparing carbon nanotube films by sequential spray deposition of the carbon nanotube (CNT) solution and a polyvinyl alcohol (PVA) solution on a porous polymeric membrane surface.

11. The method according to claim 10, further comprising:
    preparing the polyvinyl alcohol PVA solution by first dissolving PVA in DI water, followed by dilution with DI water before the sequential spray deposition.

12. The method according to claim 10, further comprising:
    heating the porous polymeric membrane surface using an air heater to facilitate solvent evaporation;
    crosslinking and heating a network of the CNT solution and the PVA solution in a glutaraldehyde and a hydrochloric acid solution; and
    drying the network of the CNT solution and the PVA solution and the porous polymeric membrane surface to form the Joule heating element.

13. A porous thin-film carbon nanotube (CNT)/polymer composite Joule heating element configured for use in an ionizable media or a desalination process, the heating element comprising:
    a carbon nanotube film comprising carbon nanotubes (CNT) and polyvinyl alcohol (PVA) on a porous polymeric membrane surface;
    a pair of metal plates arranged on ends of the heating element;

an alternating current applied at a frequency of at least 100 Hz to the pair of metal plates and the heating element in the ionizable environment or the desalination process; and wherein the porous thin-film carbon nanotube (CNT)/polymer composite Joule heating element acts as a resistor as the alternating current is applied through the porous thin-film carbon nanotube (CNT)/polymer composite Joule heating element between the pair of metal plates.

14. The heating element according to claim 13, wherein the alternating current is applied to the heating element at the frequency of at least 1000 Hz.

15. The heating element according to claim 13, wherein the alternating current is applied to the heating element at the frequency of between 100 Hz and 10,000 Hz.

16. The heating element according to claim 13, wherein the alternating current is applied to the heating element at the frequency of between 1000 Hz and 10,000 Hz.

17. The heating element according to claim 13, wherein the alternating current is applied at 20 Vpp (Voltage peak-to-peak).

18. The heating element according to claim 13, wherein the heating element is a hydrophilic-hydrophobic membrane.

19. The method according to claim 1, wherein the porous thin-film carbon nanotube (CNT)/polymer composite Joule heating element has a carbon nanotube film thickness of 15±2 μm, an electrical conductivity (in water) of 1,700±200 S m$^{-1}$, and a hydrophilic surface having an air contact angle of 160±4°.

20. The heating element according to claim 13, wherein the porous thin-film carbon nanotube (CNT)/polymer composite Joule heating element has a carbon nanotube film thickness of 15±2 μm, an electrical conductivity (in water) of 1,700±200 S m$^{-1}$, and a hydrophilic surface having an air contact angle of 160±4°.

* * * * *